No. 792,865. PATENTED JUNE 20, 1905.
F. J. WARD.
MUSIC LEAF TURNER.
APPLICATION FILED JAN. 10, 1905.
2 SHEETS—SHEET 1.
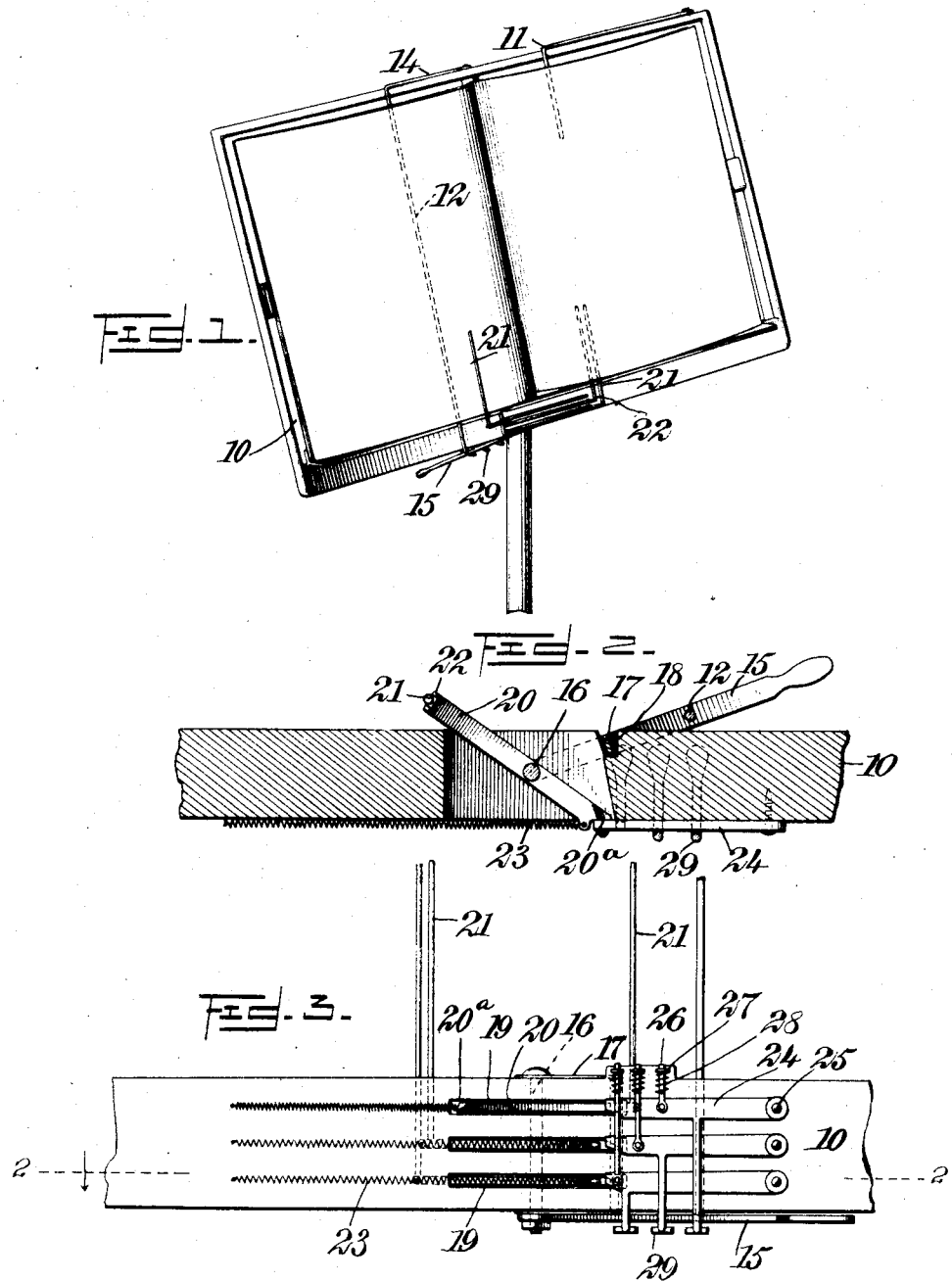
WITNESSES:
INVENTOR
Frank J. Ward
BY
ATTORNEYS No. 792,865. PATENTED JUNE 20, 1905.
F. J. WARD.
MUSIC LEAF TURNER.
APPLICATION FILED JAN. 10, 1905.
2 SHEETS—SHEET 2.
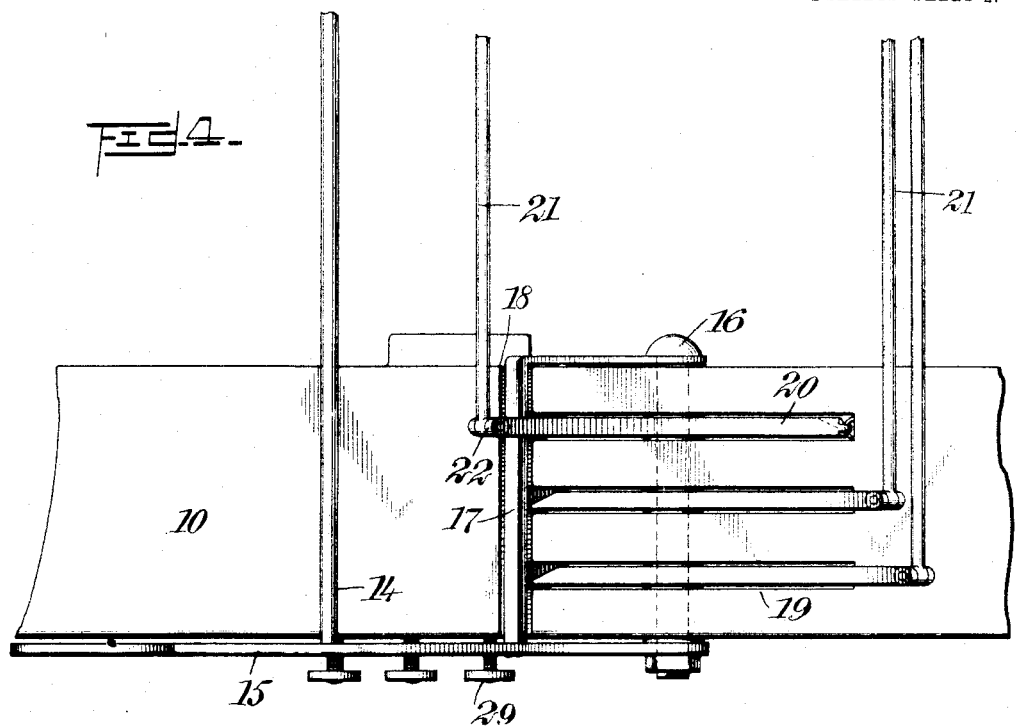
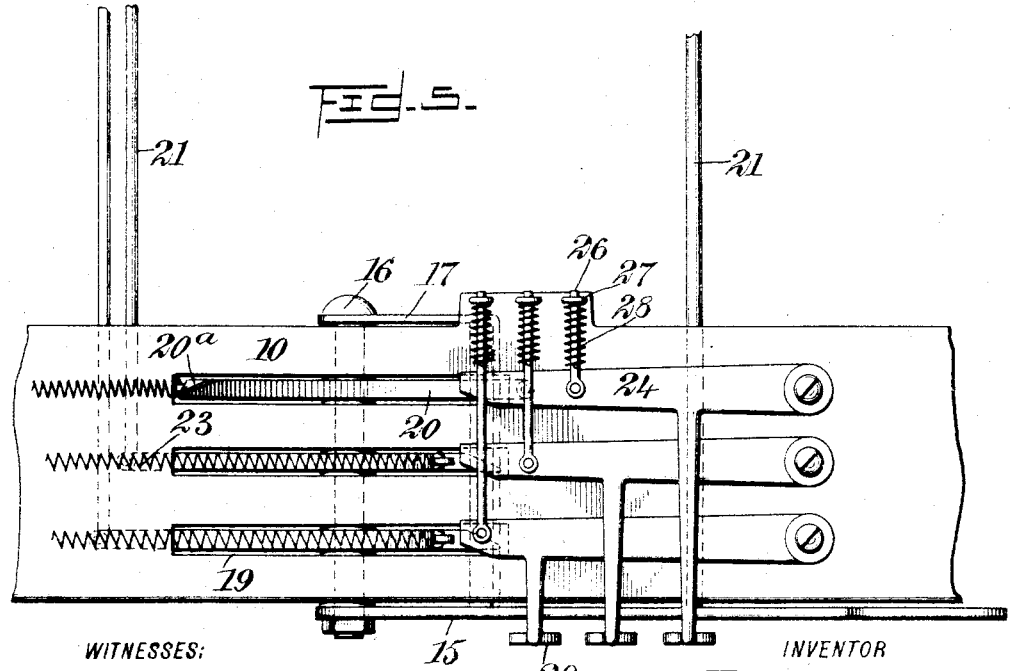
WITNESSES: INVENTOR
Frank J. Ward
BY
ATTORNEYS No. 792,865.

Patented June 20, 1905.

UNITED STATES PATENT OFFICE.

FRANK JOSEPH WARD, OF FITCHBURG, MASSACHUSETTS.

MUSIC-LEAF TURNER.

SPECIFICATION forming part of Letters Patent No. 792,865, dated June 20, 1905.

Application filed January 10, 1905. Serial No. 240,406.

To all whom it may concern:

Be it known that I, FRANK JOSEPH WARD, a citizen of the United States, and a resident of Fitchburg, in the county of Worcester and State of Massachusetts, have invented a new and Improved Music-Leaf Turner, of which the following is a full, clear, and exact description.

The invention relates to a device for successively turning the leaves of sheet-music, and it comprises peculiar levers having fingers adapted to engage the music-leaves and coacting with dogs of a special construction, which will be hereinafter set forth, these dogs restraining the levers when the device is set, and by operating the dogs the levers may be released and under the action of springs provided for this purpose caused to move in such a manner as to turn the leaves of the music.

Reference is to be had to the accompanying drawings, which illustrate the preferred embodiment of my invention, in which drawings like characters of reference indicate like parts in the several views, and in which—

Figure 1 is a perspective view showing the device in use. Fig. 2 is a sectional detail on the line 2 2 of Fig. 3, Fig. 2 showing one of the levers and the coacting dog. Fig. 3 is a rear elevation of the dogs and levers, together with the spring actuating the levers and the fingers which engage the music-leaves. Fig. 4 is an enlarged front view of the lower part of the device, particularly showing the levers and fingers; and Fig. 5 is an enlarged rear view of the lower part of the device, particularly showing the dogs or latches, their operating devices, and the levers in coaction therewith.

The device comprises a frame 10, which may be of any desired construction and which serves also to support the music-leaves. This frame is provided with a keeper 11, adapted to hold the back of the music, the keeper being mounted on the upper part of the frame to swing horizontally and having a downwardly-extending end engaging the back, as indicated by full and broken lines in Fig. 1.

The front part of the music is adapted to be engaged by a bar 12, the upper end of which is turned horizontally, as indicated at 14, and pivoted at the top of the frame, and the lower end of which is connected to a lever or handle 15, which is pivoted to the lower edge of the frame by means of a pin 16. (Best shown in Figs. 2 and 3.) Attached to the lever 15 and to the ends of the pin 16 is a U-shaped arm 17. This arm moves with the lever or handle 15 and serves to return the levers to set position, as will be hereinafter fully set forth. When the arm is inactive, it lies in a cavity 18 formed in the frame, as shown best in Figs. 2 and 4. The frame is formed with recesses 19, and in said recesses the levers 20 are arranged, said levers being fulcrumed on the pin 16, before described. The levers project from the rear of the frame to the front thereof and have the fingers 21 connected to their front ends by means of hinges 22, which enable the fingers to be thrown into horizontal or vertical position, as desired. At their rear ends the levers are connected with springs 23, which tend to throw the levers from the positions shown at the right-hand side of Fig. 1 to that shown at the left-hand side. The rear ends of the levers 20 are beveled, as indicated at $20^a$, and coact with the correspondingly-beveled ends of the dogs or latches 24. Said dogs are arranged at the rear of the frame and are pivoted thereon by pins 25, the free ends being adapted to coact with the levers 20, as the drawings illustrate. Each dog 24 is provided with a hinged pin 26, sliding in a guide 27, attached to the frame, and springs 28 act between the pins and guides so as to hold the dogs yieldingly in active position. Said dogs are also provided with finger-pieces 29, which extend downward from the dogs and thence forward under the frame and are adapted to facilitate the operation of the dogs.

In the use of the device the handle 15 is thrown from the position shown in Figs. 1 and 2 over toward the other side of the pivot 16, the U-shaped arm 17 then engaging the levers 20 and throwing all of said levers into the position indicated in Fig. 2. The beveled ends $20^a$ of the levers engage the beveled ends of the dogs and throw the dogs up momentarily, allowing the levers to ride back of the dogs, and the springs 28 then return the dogs, so as to hold the levers in the position shown in Fig. 2. The handle 15 should then be returned to the position which it is shown to occupy in Fig. 2. Then the fingers 21 should be thrown down, the hinges 22 permitting its operation, so as to clear the leaves of the music, and then return to vertical position with one finger back of each leaf. When it is desired to turn a leaf, the appropriate finger-piece 29 should be operated, actuating the appropriate dog 24 and releasing the lever 20, coacting with said dog. The spring 23 of this lever then asserts itself, and the lever is thrown back to its first position, bringing with it the music-leaf. When it is desired to turn the next leaf, the next finger is operated, and so on until all of the leaves have been turned.

It is clear that any number of fingers may be provided, dependent upon the number of leaves to be turned, and it will also be understood that various other changes in the form, proportions, and minor details may be resorted to without departing from the spirit of my invention.

Having thus described the preferred form of my invention, what I claim as new, and desire to secure by Letters Patent, is—

1. A music-leaf turner comprising the combination with a frame having openings therein extending to the rear of the frame, of levers extending through the openings and fulcrumed in the frame intermediate the ends of the levers, dogs at the rear of the frame coacting with the levers to hold them in one position, springs at the rear of the frame engaging the levers and tending to move them to a second position, and means in connection with the other ends of the levers at the front of the frame for engaging the music-leaves.

2. In a music-leaf turner, the combination with a frame, of a lever mounted thereon, means carried by the lever and adapted to engage one of the music-leaves, means for actuating said lever, a swinging member mounted on the frame, and a rod carried by the swinging member and adapted to engage the front page of the music, for the purpose specified, said rod also serving to engage said lever and to turn the same.

In testimony whereof I have signed my name to this specification in the presence of two subscribing witnesses.

FRANK JOSEPH WARD.

Witnesses:
 FRANK B. CLANCY,
 ROBERT K. HILL.